US008915434B2

(12) United States Patent
Mitchell et al.

(10) Patent No.: US 8,915,434 B2
(45) Date of Patent: Dec. 23, 2014

(54) FRAUD PREVENTION

(75) Inventors: Graeme Mitchell, Dundee (GB); Steven Ritchie, Fife (GB)

(73) Assignee: NCR Corporation, Duluth, GA (US)

( * ) Notice: Subject to any disclaimer, the term of this patent is extended or adjusted under 35 U.S.C. 154(b) by 78 days.

(21) Appl. No.: 13/099,836

(22) Filed: May 3, 2011

(65) Prior Publication Data

US 2012/0280033 A1 Nov. 8, 2012

(51) Int. Cl.

*G06K 7/08* (2006.01)
*G06K 7/00* (2006.01)
*G07F 19/00* (2006.01)

(52) U.S. Cl.

CPC .................................. *G07F 19/2055* (2013.01)
USPC ............................ 235/450; 235/449; 235/439

(58) Field of Classification Search

USPC ......... 235/379, 449, 450, 475, 477, 480, 483, 235/485, 486; 360/2, 101; D99/28, 35, 36
See application file for complete search history.

(56) References Cited

U.S. PATENT DOCUMENTS 4,587,412 A * 5/1986 Apisdorf ....................... 235/449
4,950,877 A * 8/1990 Kurihara et al. .............. 235/480
5,311,003 A * 5/1994 Saroya .......................... 235/485
5,698,832 A * 12/1997 Someya et al. ............... 235/449
5,949,048 A * 9/1999 Nakamura et al. ............ 235/439
6,031,732 A * 2/2000 Koike et al. .................. 361/816
6,042,010 A * 3/2000 Kanayama et al. ........... 235/449
6,390,367 B1 * 5/2002 Doig ............................ 235/436
6,527,187 B1 * 3/2003 Nagata et al. ................ 235/475
6,641,034 B1 * 11/2003 Oki et al. ...................... 235/380
7,100,829 B2 * 9/2006 Okada ........................... 235/439
7,143,934 B2 * 12/2006 Ghisani ......................... 235/379
7,240,827 B2 * 7/2007 Ramachandran et al. .... 235/379
7,281,656 B2 * 10/2007 Nagata et al. ................ 235/449
7,377,434 B2 * 5/2008 Wakabayashi ................ 235/449
7,469,817 B2 * 12/2008 Brumfield et al. ................ 232/7
7,810,734 B2 * 10/2010 Rakoff et al. ................ 235/475
8,348,162 B2 * 1/2013 Xiao ............................. 235/435
8,474,700 B1 * 7/2013 Lewis et al. .................. 235/379
8,496,171 B2 * 7/2013 Ross et al. .................... 235/439
8,695,879 B1 * 4/2014 Whytock ...................... 235/449
2002/0170957 A1 * 11/2002 May ............................. 235/380
2004/0011877 A1 * 1/2004 Reppermund ................ 235/493
2004/0173679 A1 * 9/2004 Oki et al. ...................... 235/449

(Continued)

FOREIGN PATENT DOCUMENTS

WO WO 2009016819 A1 * 2/2009
WO WO 2009109543 A1 * 9/2009
WO WO 2010133101 A1 * 11/2010

*Primary Examiner* — Michael G Lee
*Assistant Examiner* — Suezu Ellis
(74) *Attorney, Agent, or Firm* — Peter H. Priest

(57) ABSTRACT

A card reader guide for use in a fascia of a self-service terminal is described. The card reader guide defines a card reader aperture extending in a first direction through which a customer may insert a data card. The card reader guide also comprises: a first protrusion extending (i) along part of the card reader aperture through which a magnetic stripe of the card passes, and (ii) towards the customer, wherein the first protrusion defines a stripe path in registration with the magnetic stripe of the card as the card is inserted by the customer; a second protrusion, opposite to, and aligned with, the first protrusion, and extending (i) along the part of the card reader aperture through which the magnetic stripe of the card passes, and (ii) towards the customer; and a magnetic reader detector located in the first protrusion at the stripe path.

18 Claims, 6 Drawing Sheets

(56) References Cited

U.S. PATENT DOCUMENTS

| | | | | |
|---|---|---|---|---|
| 2009/0159676 | A1* | 6/2009 | Schliebe et al. | 235/436 |
| 2011/0006112 | A1* | 1/2011 | Mueller | 235/379 |
| 2011/0135092 | A1* | 6/2011 | Lehner | 380/252 |
| 2011/0266346 | A1* | 11/2011 | Ohta et al. | 235/449 |
| 2012/0280041 | A1* | 11/2012 | Ross et al. | 235/439 |
| 2012/0280782 | A1* | 11/2012 | Ross et al. | 340/5.3 |
| 2013/0062410 | A1* | 3/2013 | Mitchell | 235/449 |
| 2013/0119136 | A1* | 5/2013 | Ishikawa et al. | 235/449 |

* cited by examiner

FRAUD PREVENTION

FIELD OF INVENTION

The present invention relates to fraud prevention. In particular, although not exclusively, the invention relates to preventing unauthorized reading of data from a card.

BACKGROUND OF INVENTION

Unauthorized reading of card data, such as data encoded on a magnetic stripe card, while the card is being used (hereafter "card skimming"), is a known type of fraud. Card skimming is typically perpetrated by adding a magnetic read head (hereafter "alien reader") to a fascia of an automated teller machine (ATM) to read a magnetic stripe on a customer's card as the customer inserts or (more commonly) retrieves the card from an ATM. The customer's personal identification number (PIN) is also ascertained when the customer uses the ATM. Examples of how this is achieved include: a video camera that captures images of the PINpad on the ATM, a false PINpad overlay that captures the customer's PIN, or a third party watching the customer ("shoulder surfing") as he/she enters his/her PIN. The third party can then create a card using the card data read by the alien reader, and can withdraw funds from the customer's account using the created card and the customer's PIN (ascertained by one of the ways described above).

Various methods have been proposed to defeat this type of fraud. One method involves transmitting an electromagnetic signal (hereafter a "jamming signal") when the card is being transported so that the alien reader cannot detect the magnetically encoded data because of the presence of the jamming signal. Although this technique can be effective, it is possible to filter out the jamming signal so that the magnetically encoded data from the customer's card can be detected. It is also possible to use signal processing to cancel out a jamming signal by using another alien reader that receives only the jamming signal and uses this as a reference signal. The reference signal is used to cancel out the jamming signal by subtracting the reference signal from the composite signal (comprising the reference signal and the magnetic signal representing account data from the data card) to reveal the account data signal.

Using a jamming signal also has some disadvantages. If too powerful a signal is used, then there are concerns that the jamming signal could interfere with medical devices, such as heart pacemakers.

It would be advantageous to make the jamming signal more effective so that fraud prevention can be improved. It would also be advantageous to be able to limit the use of a jamming signal to those occasions where a jamming signal is necessary.

SUMMARY OF INVENTION

Accordingly, the invention generally provides methods, systems, apparatus, and software for providing improved fraud prevention.

In addition to the Summary of Invention provided above and the subject matter disclosed below in the Detailed Description, the following paragraphs of this section are intended to provide further basis for alternative claim language for possible use during prosecution of this application, if required. If this application is granted, some aspects may relate to claims added during prosecution of this application, other aspects may relate to claims deleted during prosecution, other aspects may relate to subject matter never claimed. Furthermore, the various aspects detailed hereinafter are independent of each other, except where stated otherwise. Any claim corresponding to one aspect should not be construed as incorporating any element or feature of the other aspects unless explicitly stated in that claim.

According to a first aspect there is provided a card reader guide for use in a fascia of a self-service terminal, the card reader guide comprising:

a card reader aperture extending in a first direction through which a customer may insert a data card;

a first protrusion extending (i) along part of the card reader aperture through which a magnetic stripe of the card passes, and (ii) towards the customer, wherein the first protrusion defines a stripe path in registration with the magnetic stripe of the card as the card is inserted by the customer;

a second protrusion, opposite to, and aligned with, the first protrusion, and extending (i) along the part of the card reader aperture through which the magnetic stripe of the card passes, and (ii) towards the customer; and a magnetic reader detector located in the first protrusion at the stripe path.

The card reader guide may further comprise a shielding plate coupled thereto and located behind the card reader aperture so that the magnetic reader detector does not detect any components within the self-service terminal (SST). The shielding plate may comprise a metal, a metal alloy, a plastics material having a conducting coating, or the like. The shielding plate prevents metal components within the SST being detected as alien card readers. For example, if a motorized card reader within the SST is moved closer to the card reader aperture than usual (for example, after a service operation), then this may (incorrectly) be detected as an alien device.

The shielding device preferably includes an aperture through which the data cards can be transported between the card reader guide and a card reader within the SST.

A signal generator circuit may be located in the second protrusion.

The shielding device may define a plurality of apertures for routing cables therethrough, such as cables extending between the magnetic reader detector and a controller card coupled to an SST controller, and between the signal generator circuit and the controller card.

The magnetic reader detector may comprise a capacitive sensor. The capacitive sensor may comprise a transmit plate spatially separated from a receive plate by a ground strip. The ground strip may have a longitudinal shape and may extend transversely to the card reader aperture and towards the customer. The ground strip may be in registration with the stripe path. The ground strip may be in registration with a track two portion of the stripe path. By aligning the ground strip with the track two portion, the capacitive sensor covers a strip that an alien reader must be close to so that the alien reader can read track two data from a data card. Track two data includes an account number.

The capacitive sensor may receive an alternating voltage on the transmit plate

According to a second aspect there is provided a self-service terminal (SST) incorporating the card reader guide according to the first aspect.

The SST may include a card reader.

The card reader guide may be removably coupled to an SST fascia.

The self-service terminal may be an automated teller machine (ATM), an information kiosk, a financial services centre, a bill payment kiosk, a lottery kiosk, a postal services machine, a check-in and/or check-out terminal such as those used in the retail, hotel, car rental, gaming, healthcare, and airline industries, and the like.

The first protrusion may be located beneath the second protrusion. Alternatively, the first protrusion may be located above the second protrusion. In some embodiments, the card reader slot may extend vertically (or at least not horizontally) so the first and second protrusions may be laterally (or even diagonally) offset.

The first and second protrusion may extend by the same amount (or nearly the same amount) from the card reader aperture as a card is ejected by the card reader, so that the customer must place his/her fingers on the part of the card that is not enclosed by the first and second protrusions. This also has the advantage that it is more difficult to place a magnetic reader (that is, an alien reader) at the end of one of the protrusions without the customer noticing that there is an alien device present. Furthermore, by forcing placement of an alien reader further from the card reader aperture there is an increased probability that the customer will skew the card as it is being removed. This may cause the magnetic stripe on the card to miss the alien reader.

Using protrusions to cover the part of a card having the magnetic stripe is in contrast to known card reader guides where the protrusions extend along a part of the card that does not have a magnetic stripe so that the customer can only grasp the card by the portion carrying the stripe.

For clarity and simplicity of description, not all combinations of elements provided in the aspects recited above have been set forth expressly. Notwithstanding this, the skilled person will directly and unambiguously recognize that unless it is not technically possible, or it is explicitly stated to the contrary, the consistory clauses referring to one aspect are intended to apply *mutatis mutandis* as optional features of every other aspect to which those consistory clauses could possibly relate.

These and other aspects will be apparent from the following specific description, given by way of example, with reference to the accompanying drawings.

Figure 1:
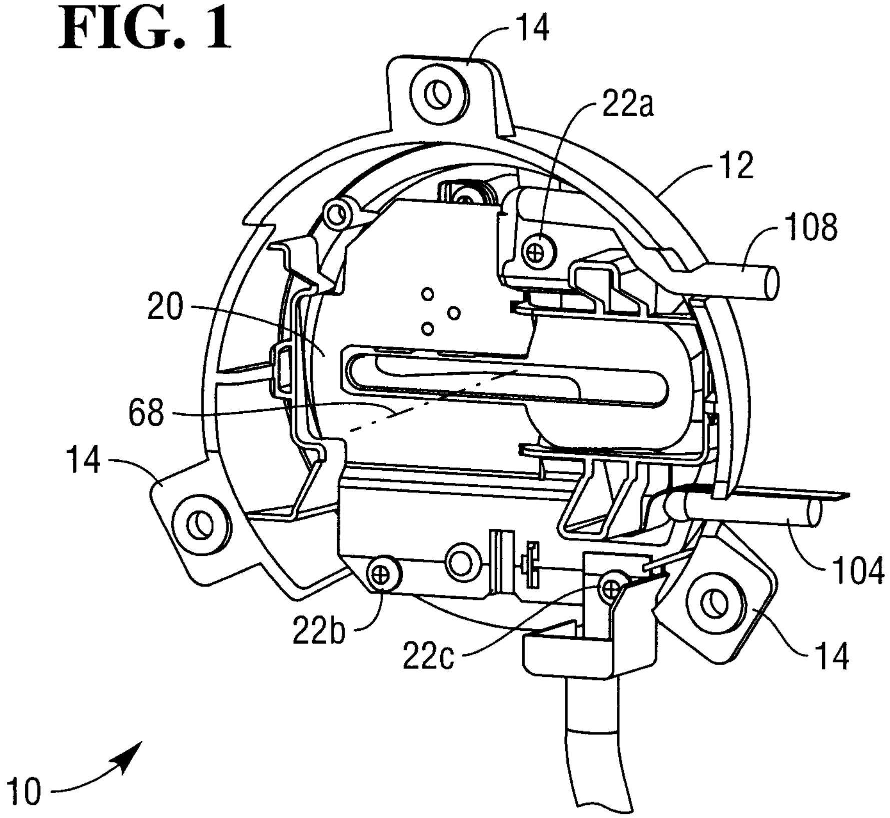
FIG. 1 is a pictorial diagram of a rear perspective view of a card reader guide according to one embodiment of the present invention.

It should be appreciated that some of the drawings provided are based on computer renderings from which actual physical embodiments can be produced. As such, some of these drawings contain details that are not essential for an understanding of these embodiments but will convey useful information to one of skill in the art. Therefore, not all parts shown in the drawings will be referenced specifically. Furthermore, to aid clarity and to avoid numerous leader lines from cluttering the drawings, not all reference numerals will be shown in all of the drawings. In addition, some of the features are removed from some views to further aid clarity.

DETAILED DESCRIPTION

Reference is first made to FIG. 1, which is a pictorial diagram of a rear perspective view of a card reader guide 10 according to one embodiment of the present invention. The card reader guide 10 comprises a card reader guide cover 12 defining three apertured tabs 14 by which the card reader guide cover 12 is coupled to a rear part of a fascia (not shown in FIG. 1) of an SST.

The card reader guide 10 further comprises a shielding plate 20 coupled to the card reader guide cover 12 by three screws 22*a,b,c*.

Figure 2:
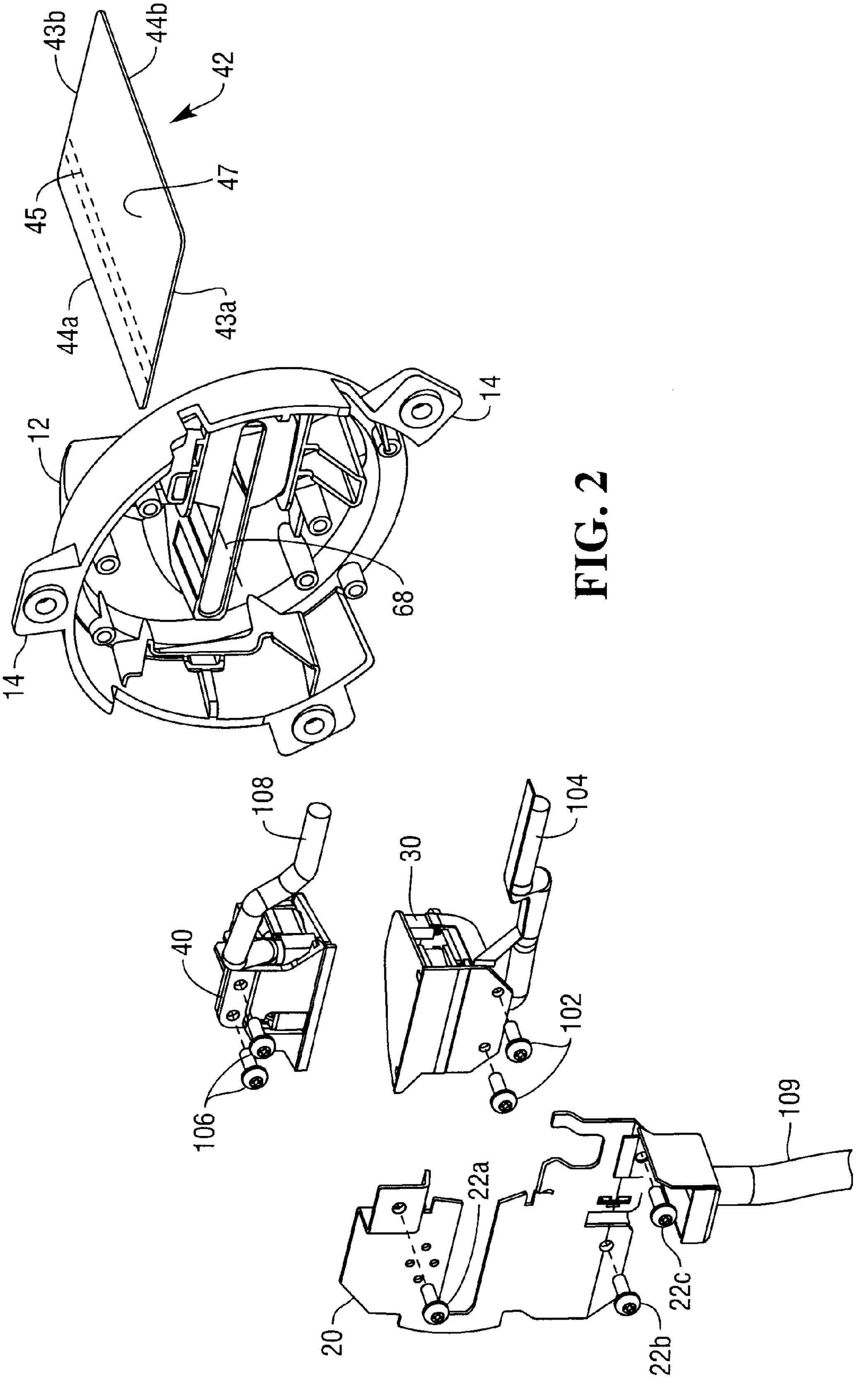
FIG. 2 is an exploded pictorial diagram illustrating components of the card reader guide of FIG. 1.

Reference is now also made to FIG. 2, which is an exploded pictorial diagram illustrating components of the card reader guide 10. FIG. 2 illustrates a magnetic reader detector 30 and a signal generator 40. FIG. 2 also shows a data card 42 (in the form of a magnetic stripe card) aligned with the card reader guide 10.

The card reader guide 10 is operable to receive the magnetic stripe card 42, which is inserted by a customer. A magnetic stripe card has a large planar area (the length and width) on each of two opposing sides and a four thin edges therebetween. Two of these edges (front and rear) 43*a,b* are narrower than the other two edges (the side edges) 44*a,b*. The magnetic stripe side (the lower side) of a card refers to the large planar area that carries a magnetic stripe 45 (shown in broken line in FIG. 2). The magnetic stripe 45 is disposed parallel to the side edges 44*a,b*.

Opposite the magnetic stripe side (the upper side 47) there is a large planar area that (typically) does not carry a magnetic stripe 45, but typically includes account and customer information embossed thereon. On some cards, the upper side 47 may carry integrated circuit contacts. On the magnetic stripe side of the card, the magnetic stripe 45 is not centrally located; rather, it is located nearer to one of the side edges (referred to as the magnetic stripe edge 44*a*) than to the other side edge (referred to as the non-magnetic stripe edge 44*b*).

Figure 3:
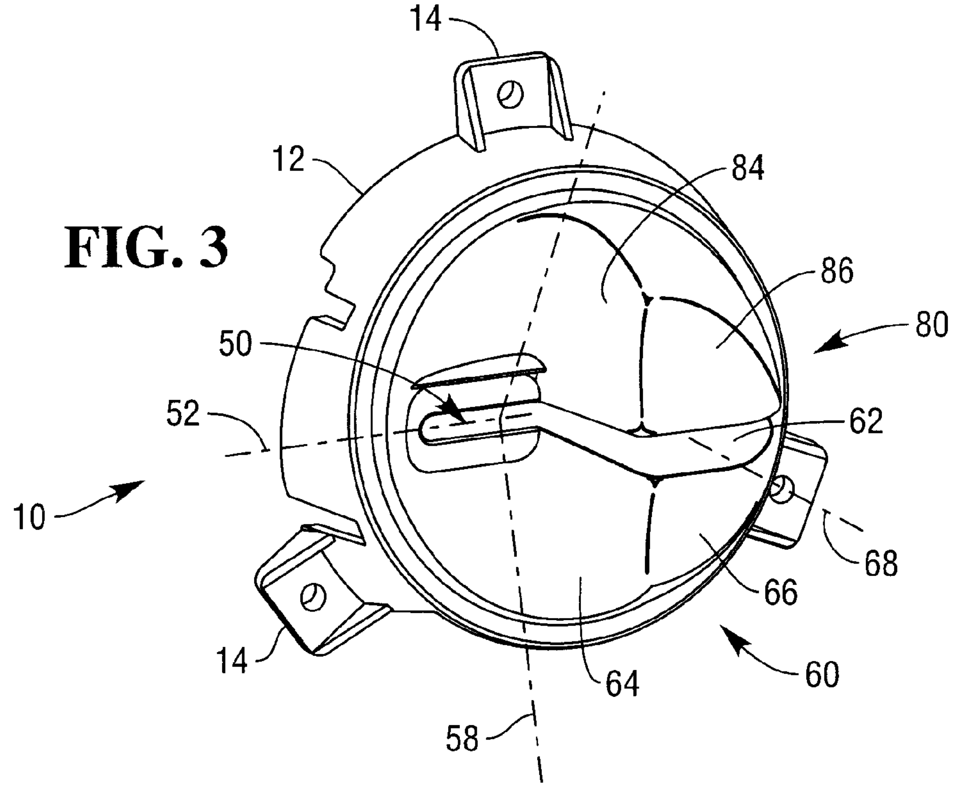
FIG. 3 is a front perspective view of one part (the card reader guide cover) of the card reader guide of FIG. 1.
Figure 4:
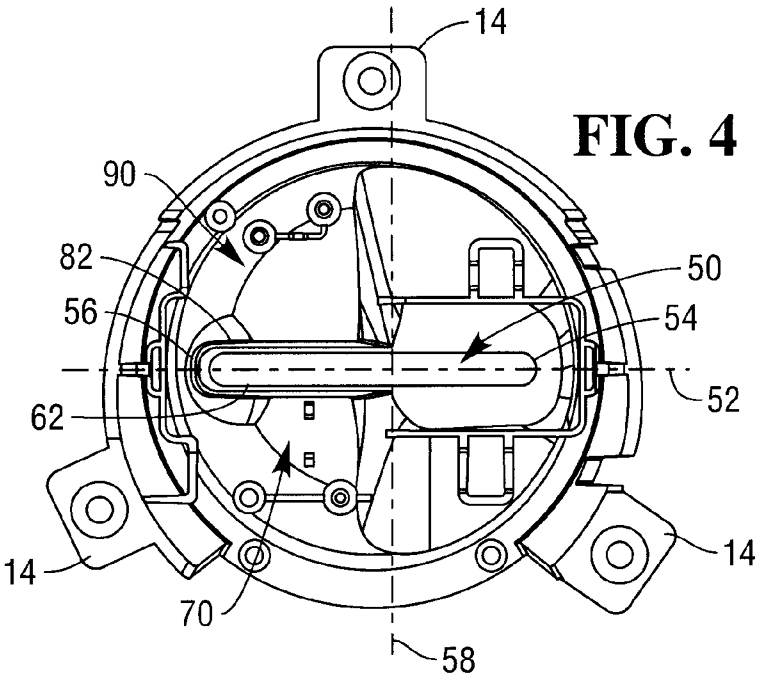
FIG. 4 is a rear perspective view of the card reader guide cover of FIG. 3.

Reference will now also be made to FIGS. 3 and 4, which are front and rear perspective views, respectively, of the card reader guide cover 12.

The card reader guide cover 12 comprises a moulded plastics part dimensioned to be accommodated within, and partially protrude through, an aperture in a fascia (not shown in FIG. 2).

The card reader guide 10 defines a card slot 50 extending generally horizontally across the guide 10 in the direction of centre line 52, from a non-stripe end 54 to a stripe end 56. When the magnetic stripe card 42 is correctly inserted into the card slot 50 by a customer then the magnetic stripe 45 on the magnetic stripe card 42 is located closer to the stripe end 56 than to the non-stripe end 54.

The card reader guide 10 defines a breakout line 58 extending generally vertically (perpendicular to the card reader slot 50). The card reader guide 10 also defines a first (lower) protrusion 60.

The first (lower) protrusion 60 includes a planar section 62 across which the magnetic stripe side of a card passes as the card 42 is inserted. The first (lower) protrusion 60 also includes an upright section 64 that extends from the breakout line 58 to an end surface 66. The end surface 66 is spaced from the card slot 50 to ensure that card does not protrude beyond the end surface 66 when ejected by a card reader (not shown in FIGS. 2 to 4) within the SST.

A magnetic stripe path 68 is defined on the planar section 62. This is the portion of the planar section 62 that the magnetic stripe 45 on a correctly inserted data card 42 will be in registration with when the card 42 is inserted or removed by a customer. In this embodiment, the magnetic stripe path 68 is centered on track two of a magnetic stripe. It is track two that carries the customer account information for the data card 42, so track two is the track that alien readers attempt to read.

The first protrusion 60 also defines a cavity (best seen in FIG. 4 and shown generally by arrow 70), which is referred to herein as the "detector cavity", and which is beneath the planar section 62 and within the card reader guide cover 12.

The card reader guide 10 defines a second (upper) protrusion 80 similar to, aligned with, and opposite the first protrusion 60.

The second (upper) protrusion 80 includes a planar section 82 (best seen in FIG. 4) beneath which a magnetic stripe side of a card 42 passes as the card 42 is inserted. The second (upper) protrusion 80 also includes an upright section 84 that extends from the breakout line 58 to an end surface 86. The second protrusion 80 defines a cavity 90 (referred to herein as the "signal generator cavity") above the planar section 82 and within the card reader guide cover 12.

Referring again to FIG. 2, the magnetic reader detector 30 is dimensioned to be accommodated within the detector cavity 70 and is mounted therein by two screws 102 that engage with the card reader guide 10. The magnetic reader detector 30 includes a communication cable 104 for routing signals and power between the magnetic reader detector 30 and an external controller (not shown in FIG. 2). Such a controller would typically be located in an SST in which the card reader guide 10 is installed.

Similarly, the signal generator 40 is dimensioned to be accommodated within the signal generator cavity 90 and is mounted therein by two screws 106 that engage with the card reader guide 10. The signal generator 40 also includes an output cable 108 for routing signals and power between the signal generator 40 and the external controller (not shown in FIG. 2).

A drainage pipe 109 is also provided to drain away any water ingress from the card slot 50.

Figure 5:
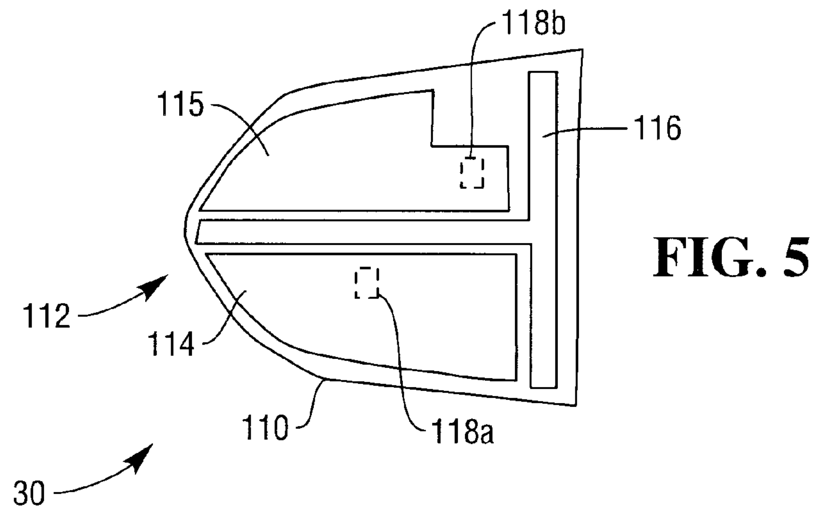
FIG. 5 is a pictorial plan view of part (the magnetic reader detector) of one of the components of the card reader guide shown in FIG. 2.

Reference will now be made to FIG. 5, which is a pictorial plan view of part of the magnetic reader detector 30. The magnetic reader detector 30 comprises a track printed circuit board (pcb) 110 on which is disposed part of a capacitive sensor 112 and an electronic drive circuit (not shown in FIG. 5) located beneath the track pcb 110.

The magnetic reader detector 30 is physically configured to conform to the shape of the detector cavity 70 so that when the magnetic reader detector 30 is inserted into the detector cavity 70 the track pcb 110 fits securely in place.

The capacitive sensor 112 operates in a similar way to a capacitive proximity sensor, as will now be described. The capacitive sensor 112 comprises a transmit plate 114 separated from a receive plate 115 by a linear track (a ground strip) 116. The transmit plate 114, receive plate 115, and ground strip 116 are all defined as conducting tracks on the track pcb 110.

The ground strip 116 is located on the track pcb 110 such that when the magnetic reader detector 30 is inserted into the lower protrusion 60 of the card reader guide 10, the ground strip 116 is in registration with the magnetic stripe path 68. In particular, the ground strip 116 is aligned with track two of the magnetic stripe path 68. This is illustrated in FIG. 6, which is a pictorial perspective view of the card reader guide 10, with the card reader guide cover 12 shown as partially transparent to reveal the magnetic reader detector 30.

The capacitive sensor 112 operates by transmitting an alternating signal on the transmit plate 114, which creates an electric field between the transmit plate 114 and the receive plate 115 that arches over the ground strip 116, the air gap in the arch providing the dielectric. If a material (such as an alien reader, or a data card) is inserted into this electric field then the dielectric changes, which changes the phase and magnitude of the electric field. This is detected by the receive plate 115.

Figure 6:
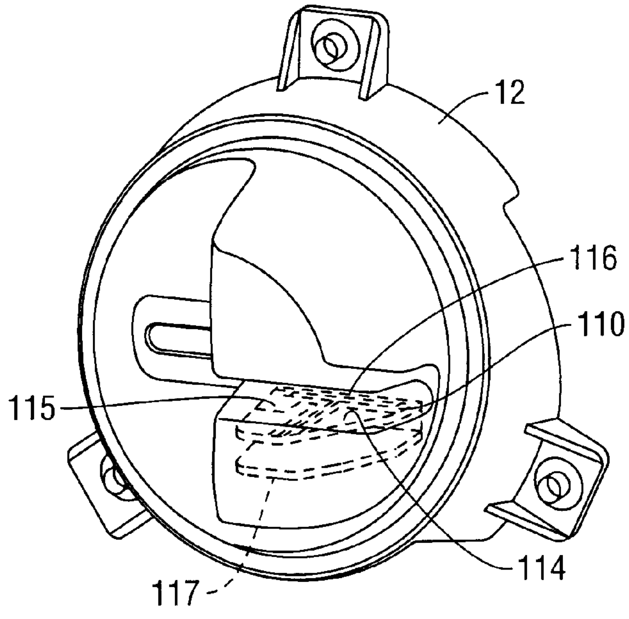
FIG. 6 is a pictorial perspective view of the card reader guide of FIG. 1, with the card reader guide cover of FIG. 3 shown as partially transparent to reveal the magnetic reader detector of FIG. 5.

Drive and signal processing circuitry (not shown in FIG. 5) is located on a drive pcb 117 (located beneath the track pcb 110, as shown in FIG. 6) to provide the alternating signal and detect the phase and magnitude changes.

The geometry, configuration, and location of the transmit plate 114, receive plate 115, and ground strip 116 optimizes the probability of the capacitive sensor 112 detecting an alien reader, because any alien reader must be located at a point over which track two of the card's magnetic stripe will pass, and the electric field is located along this path.

The track pcb 110 also includes two magnetic sensors 118*a,b* mounted on an underside thereof.

The communication cable 104 conveys one signal from each of the two magnetic sensors 118, power to supply the capacitive sensor 112, and one response signal from the capacitive sensor 112.

Figure 7:
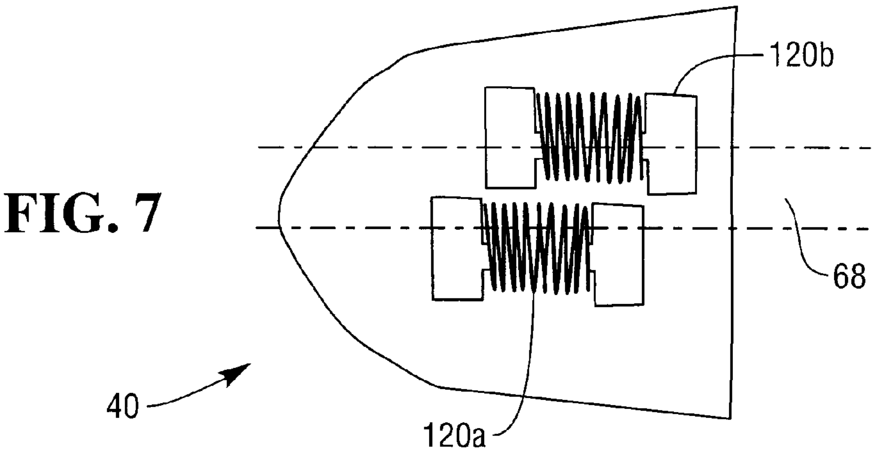
FIG. 7 is a pictorial plan view of another part (the signal generator) of one of the components of the card reader guide shown in FIG. 2.
Figure 8:
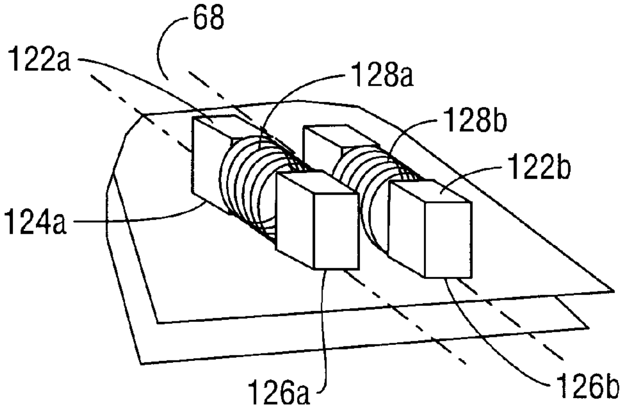
FIG. 8 is a pictorial perspective view of the signal generator of FIG. 7.

Reference will now be made to FIGS. 7 and 8, which are a pictorial plan view and perspective view respectively, of part of the signal generator 40 shown relative to the magnetic stripe path 68.

The signal generator 40 comprises a pair of inductive coil drives 120*a,b*. Each inductive drive coil 120*a,b* comprises a generally C-shaped (when viewed from the side) ferrite core 122*a,b* having opposing poles (north pole 124*a,b* (only 124*a* is shown) and south pole 126*a,b*) at opposite ends, and being wound with wire 128*a,b* at a central portion. Each inductive coil drive 120*a,b* is driven by a signal from the external controller (not shown in FIGS. 7 and 8). The C-shape of the ferrite cores ensures that most of the electromagnetic field generated by the inductive coil drives 120*a,b* extends downwards towards the magnetic stripe path 68, rather than upwards.

Each of the inductive coil drives 120*a,b* is aligned with the magnetic stripe path 68 but the two inductive coil drives are longitudinally offset relative to each other (as shown in FIG. 7). Thus, the two inductive coils 120*a,b* do not generate a symmetric electromagnetic field. This longitudinal offsetting makes it more difficult for a fraudster to filter out the combined signal from the two inductive coil drives 120*a,b*.

One of the two magnetic sensors 118*a,b* is in registration with a centre point between the poles 124*a*, 126*a* of the first ferrite core 122*a*, the other of the two magnetic sensors 118*b* is in registration with a centre point between the poles of the second ferrite core 122*b*. Each of the two magnetic sensors 118*a,b* measures the magnetic signal present. If the two inductive coils 120*a,b* are active then a large magnetic signal should be detected by each of the two magnetic sensors 118*a, b*.

Figure 9:
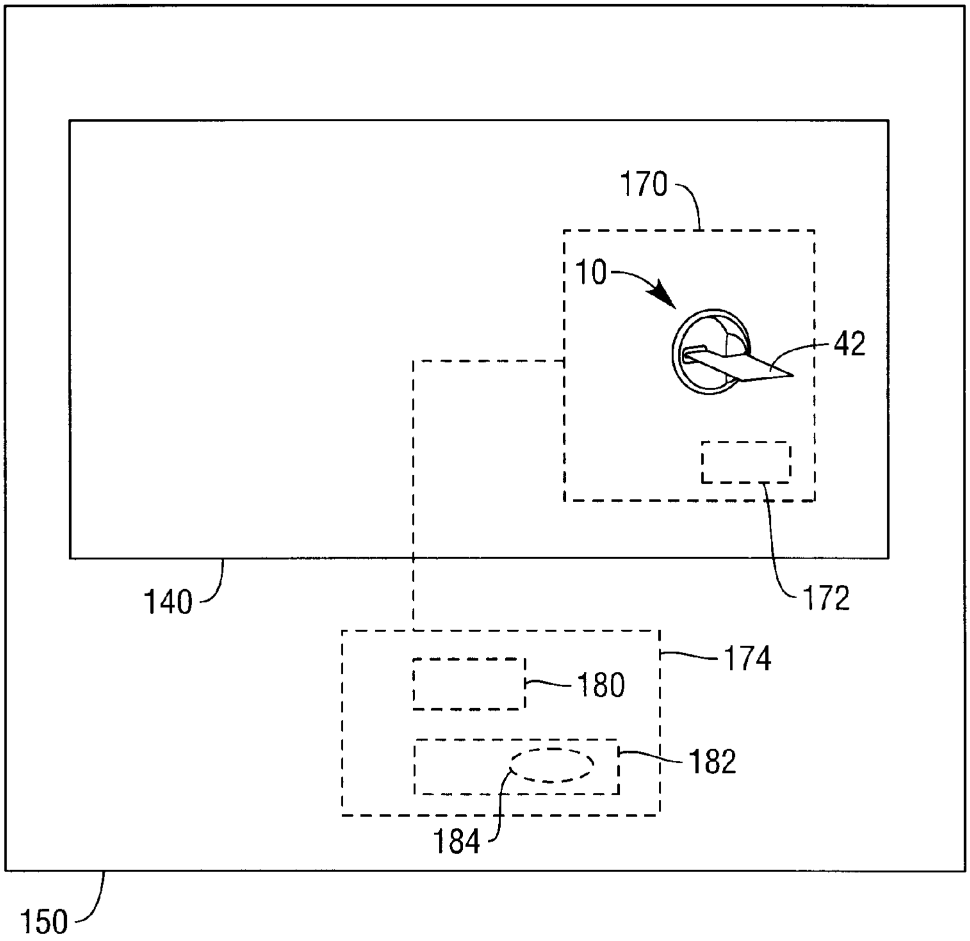
FIG. 9 is a simplified schematic view of a fascia of a self-service terminal incorporating the card reader guide of FIG. 1.

Reference will now also be made to FIG. 9, which is a pictorial diagram of a fascia 140 of an SST 150 that includes the card reader guide 10, and shows the data card 42 partially inserted therein.

A motorized card reader 170 (illustrated in broken line) is aligned with, and located behind, the card reader guide 10 so that a card transport path (not shown in FIG. 9) in the card reader 170 aligns with the card slot 50 of the card reader guide 10. The card reader 170 includes a card reader controller 172 for controlling operation of the card reader 170.

In this embodiment the motorized card reader is from Sankyo Seiki Mfg Ltd at 1-17-2, Shinbashi, Minato-Ku, Tokyo, 1058633, Japan. However, any other convenient motorized card reader could be used.

The SST also includes an SST controller 174, which includes a card guide control circuit 180 implemented as an expansion board that slots into a motherboard (not shown) on which a processor 182 is mounted. The processor 182 executes an SST control program 184.

The SST control program 184 controls the operation of the SST, including communicating with modules such as the card reader 170, and presenting a sequence of screens to a customer to guide the customer through a transaction.

Figure 10:
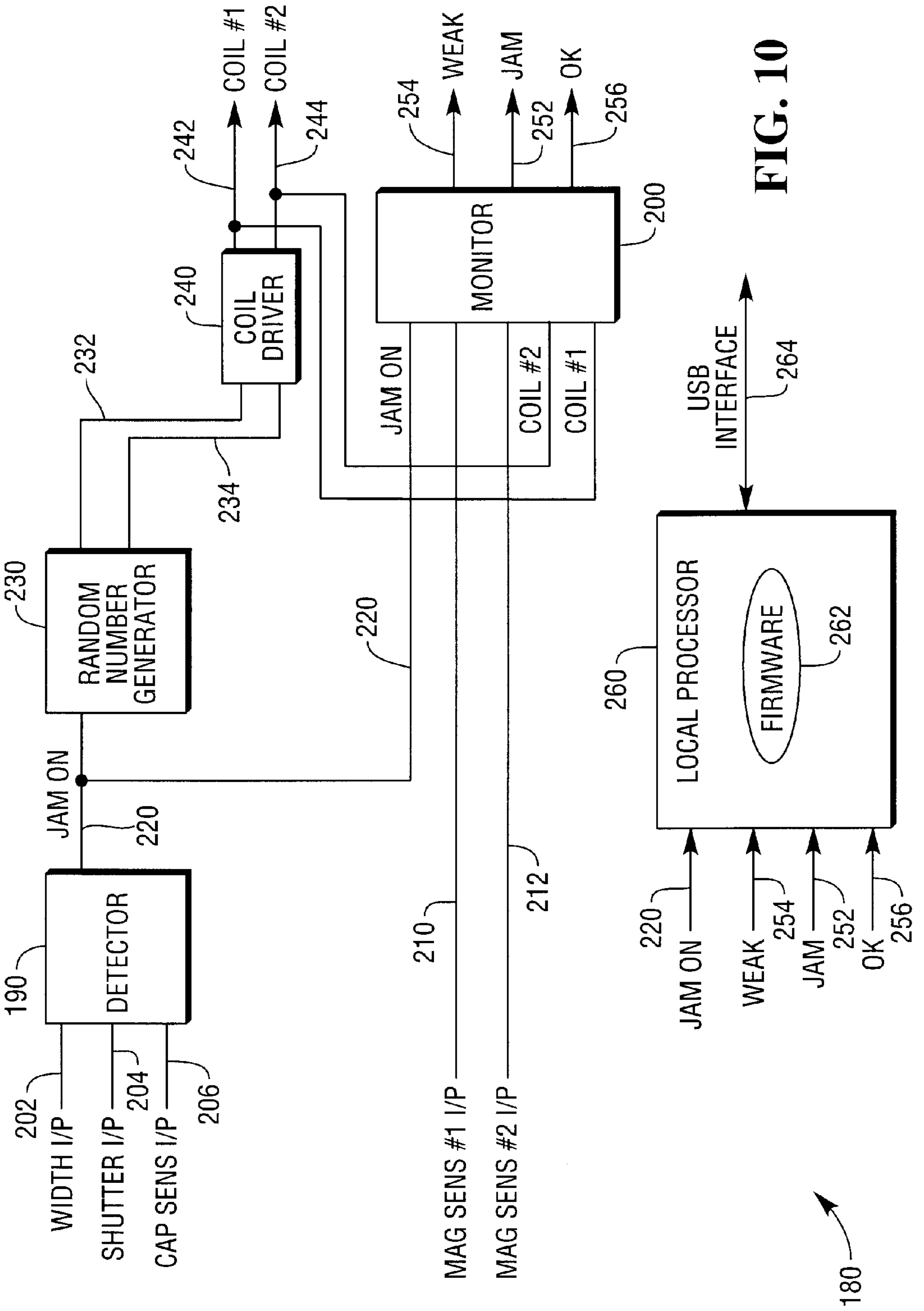
FIG. 10 is a block diagram of a controller for controlling the operation of the magnetic reader detector of FIG. 5 and the signal generator of FIG. 7.

Reference will now also be made to FIG. 10, which is a simplified block diagram of the card guide control circuit 180 that is used to control the electronic components in the card reader guide 10 and to indicate if an alien reader may be present.

The control circuit 180 receives five inputs. Three of these inputs are fed into a detector 190, the other two inputs are fed into a monitor 200.

One of the detector inputs (the width switch status) 202 indicates the status of a width switch (not shown) on the card reader 170. As is known in the art, when the width switch is closed, this indicates that an object inserted into the card reader 170 has a width that matches that of a standard data card.

Another of the detector inputs (the shutter status) 204 indicates the status of a shutter (not shown) in the card reader 170. The shutter can either be open or closed and controls access to a card reader path within the card reader 170. The shutter 170 is only opened by the card reader controller 172 (FIG. 9) within the card reader 170 if the width switch is closed and a magnetic pre-read head (not shown) in the card reader 170 detects a magnetic stripe. As is known in the art, the pre-read head is used to ensure that a data card has been inserted in the correct orientation.

The third detector input (from the capacitive sensor 112) 206 indicates the state of the output signal from the capacitive sensor 112. The capacitive sensor input 206 indicates whether an object is present in the vicinity of the magnetic stripe path 68.

The two inputs 210,212 (referred to as magnetic signal inputs) that are fed into the monitor 200 are from the two magnetic sensors 118*a,b*. These magnetic signal inputs 210, 212 indicate the presence of a magnetic signal at each of the two magnetic sensors 118*a,b* respectively.

The detector 190 includes logic circuitry and provides an active output 220 (referred to as the jam signal) when the width switch is open (the width switch status input 202 is active), the shutter is open (the shutter status input 204 is active), and an alien object is detected by the capacitive sensor input 206. Basically, when this condition occurs, the control circuit 180 generates a jamming signal. This should occur every time a card is inserted by a customer because the inserted card changes the dielectric value of the air gap above the capacitive sensor 112.

The jam signal 220 is fed into a random number generator circuit 230 (which may generate truly random or pseudo random numbers). Random number generating circuits are well-known to those of skill in the art so will not be described herein in detail.

The random number generator circuit 230 provides two outputs: a first random signal 232 and a second random signal 234. These two outputs 232,234 (which convey different random signals) are fed into a coil driver circuit 240.

The coil driver circuit 240 generates two base signals (a first base signal and a second base signal), each centered on approximately 2 kHz. The coil driver circuit 240 applies the first random signal 232 to the first base signal; and the second random signal 234 to the second base signal, and outputs these as a first drive signal 242 and a second drive signal 244 respectively. In this embodiment, the random signals are in the form of a bit pattern sequence. The coil driver circuit 240 uses the random signals (the bit pattern sequences) to change the duty cycle of each of the first and second base signals. That is, the random signals are used to provide pulse width modulation of the 2 kHz signals. The important point is that the random signals 232,234 are used to impart some randomness to the regular (2 kHz) base signals. This randomness may comprise pulse width modulation, amplitude modulation, superimposing a high frequency component on a base signal, or any other convenient technique. This added randomness makes it much more difficult to filter out the signals.

The first drive signal 242 is output to the first inductive coil drive 120*a*; and the second drive signal 244 is output to the second inductive coil drive 120*b*. Thus, the first and second drive signals 242,244 are the signals that drive the inductive coil drives 120*a,b*.

The first and second drive signals 242,244 are also output to the monitor 200. The main purpose of the monitor 200 is to ensure that the magnetic reader detector 30 is not being (i) jammed by an external signal, or (ii) screened so that it does not detect an alien reader. To achieve this purpose, the monitor 200 continually monitors the two magnetic signal inputs 210,212 from the two magnetic sensors 118*a,b*. As mentioned above, these magnetic signal inputs 210,212 indicate the presence of magnetic signals at the two magnetic sensors 118*a,b*.

The monitor 200 correlates these two magnetic signal inputs 210,212 with the jam signal 220. Due to time delays in creating an electro-magnetic field at the coil drives 120, there will be a short delay between each of the coil drive signals 242,244 going active, and the two magnetic sensors 118*a,b* detecting a magnetic field. Hence there will be a delay between the coil drive signals 242,244 going active and the magnetic signal inputs 210,212 going active. Similarly, when the coil drive signals 242,244 go inactive, there will be a short delay before the magnetic signal inputs 210,212 go inactive.

If the monitor 200 detects that a magnetic signal input 210,212 is active at the instant when the associated coil drive signal 242,244 has just transitioned to active, then this may indicate that a third party is attempting to jam the magnetic reader detector 30. This is because there should be a time delay between the coil drive signal 242,244 going active and an electro-magnetic field being detected. If there is no time delay, then the magnetic signal input 210,212 that was detected as active must have been active before the coil drive signal was activate. If such an event occurs on "m" consecutive occasions, then the monitor 200 activates a jam attack output 252. The jam attack output 252 indicates that an electromagnetic field is present that was not generated by the coil drives 120*a,b*. In this embodiment, "m" is four, so the jam attack output 252 is activated if this condition occurs on four consecutive occasions.

Similarly, if the monitor 200 detects that a magnetic signal input 210,212 is inactive at the instant when the associated coil drive signal 242,244 has just transitioned to inactive, then this may indicate that a third party is attempting to shield (or screen) the magnetic reader detector 30 from the electromagnetic field generated by the coil drives 120*a,b*. This is because there should be a time delay (a time lag) between the coil drive signal 242,244 going inactive and the electro-magnetic field generated by those coil drives 120*a,b* reducing to zero. If there is no time delay, then the magnetic signal input 210,212 that was detected as inactive must have been inactive before the coil drive signal was inactivated. If such an event occurs on "n" consecutive occasions, then the monitor 200 activates a weak output 254. The weak attack output 254 indicates that no electromagnetic field is present even though the coil drives 120*a,b* are generating (or attempting to generate) an electromagnetic field. This may indicate that a third party is attempting to shield (or screen) the two inductive coil drives 120*a,b* to prevent them from jamming an alien reader. In this embodiment, "n" is four, so the weak output 254 is activated if this condition occurs on four consecutive occasions.

If both of the magnetic sensors 118*a,b* detect magnetic signals that correlate with the first and second drive signals 242,244, then the monitor 200 activates a normal (OK) output 256 to indicate that the correct jamming signals have been detected from the inductive coil drives 120*a,b*. In other words, if both of the magnetic sensors 118*a,b* detect magnetic signals that are correctly offset from the first and second drive signals 242,244 respectively, then the monitor 200 activates the normal output 256. In this embodiment, correctly offset means that there is a time delay between each of the magnetic signal sensors 118*a,b* and its associated first and second drive signal 242,244 that corresponds to an expected time delay.

The card guide circuit 180 also includes a local processor 260 including firmware 262. The firmware 262 interfaces with the logic circuitry in the card guide circuit 180, and communicates with the SST control program 184 via a USB interface 264.

The local processor 260 receives the three outputs 252,254, 256 from the monitor 200 and also the jam signal 220, and the firmware 262 decides whether to raise an alarm based on the status of these signals.

The firmware 262 may transmit an alarm signal if the jam signal 220 is active for longer than a predetermined length of time, for example, one minute, or if either of the weak output 254 or the jam attack output 252 is active, or if either of the weak output 254 or the jam attack output 252 is active for longer than a predetermined time (for example, five seconds).

The firmware 262 communicates with the SST control program 184 and provides an alarm signal (which may be active or inactive) thereto over the USB interface 264. This enables the SST control program 184 to take action if the alarm signal is active. The firmware 262 may also include a simple network management protocol (SNMP) agent (not shown) that transmits a trap to a remote management centre (not shown) if the alarm signal is set active by the firmware 262.

During operation, when a customer inserts the data card 42, the width switch is closed and the pre-read head detects the magnetic stripe 45 on the underside of the card 42. The card reader 170 then opens the shutter. The capacitive sensor input 206 indicates that an object (the data card 42) is present. This combination causes the detector 190 to activate the jam signal 220.

The active jam signal 220 causes the random number generator 230 to generate the first and second random signals 232,234, which the coil driver 240 applies to the first and second base signals to generate the first and second drive signals 242,244, which now have different duty cycles. These signals 242,244 are used to power the inductive coil drives 120*a,b* respectively, which create electromagnetic fields around the data card 42. In this embodiment, the random signals 232,234 are continuous bit streams that are applied to the base signals as the base signals are being generated.

The monitor 200 attempts to correlate the two inputs 210, 212 from the two magnetic sensors 118*a,b* with the first and second drive signals 242,244.

If the signals correlate (that is, the transitions are correct and occur at approximately the correct time delay) then the monitor 200 activates the normal (OK) output 256.

If when the first drive signal 242 goes active, the magnetic signal input 210 is already active, then the monitor 200 records this as a potential jam and increments a counter. If this occurs four times in succession, then the monitor 200 activates the jam attack output 252. If this does not happen four times in succession, for example, on the third occasion the status is correct, then the monitor 200 resets the counter.

Similarly, if when the second drive signal 244 goes inactive, the magnetic signal input 212 is already inactive, then the monitor 200 records this as a potential shielding attack and increments a counter. If this occurs four times in succession, then the monitor 200 activates the weak output 254. If this does not happen four times in succession, for example, on the third occasion the status is correct, then the monitor 200 resets the counter.

In this embodiment, if the jam attack signal 252 or the weak output 254 is active for more than two seconds, then the card guide control circuit 180 raises an alarm, causing the SST controller 174 to complete any current transaction, return the data card 42 to the customer, then put the SST 150 out of service and send an alarm signal to a remote management centre (not shown) to request a visit from a service engineer.

Various modifications may be made to the above described embodiment within the scope of the invention, for example, in other embodiments, the number of inductive coil drives 120 may be more or less than two. In other embodiments, the inductive coil drives 120 may be driven at a frequency other than 2 kHz.

In other embodiments, the number of times in succession that a correlation must be incorrect before the appropriate signal is activated may be more or less than four, and may differ for the jam attack output and the weak output.

In other embodiments, the control circuit 180 may include a built-in alarm.

In other embodiments the shape of the protrusions may differ from those described above.

The steps of the methods described herein may be carried out in any suitable order, or simultaneously where appropriate.

The terms "comprising", "including", "incorporating", and "having" are used herein to recite an open-ended list of one or more elements or steps, not a closed list. When such terms are used, those elements or steps recited in the list are not exclusive of other elements or steps that may be added to the list.

Unless otherwise indicated by the context, the terms "a" and "an" are used herein to denote at least one of the elements, integers, steps, features, operations, or components mentioned thereafter, but do not exclude additional elements, integers, steps, features, operations, or components.

The presence of broadening words and phrases such as “one or more,” “at least,” “but not limited to” or other similar phrases in some instances does not mean, and should not be construed as meaning, that the narrower case is intended or required in instances where such broadening phrases are not used.

What is claimed is:

1. A card reader guide for use in a fascia of a self-service terminal, the card reader guide comprising:

a card reader aperture extending in a first direction through which a customer may insert a card with a data storing magnetic stripe to a magnetic card reader;

a first protrusion extending (i) along part of the card reader aperture through which the magnetic stripe of the card passes, and (ii) towards the customer, wherein the first protrusion defines a stripe path aligned with the magnetic stripe of the card as the card is inserted by the customer;

a second protrusion, opposite to, and aligned with, the first protrusion, and extending (i) along the part of the card reader aperture through which the magnetic stripe of the card passes, and (ii) towards the customer, a further portion beside the first and second protrusions providing a customer with the ability to remove the card by grasping a non-magnetic stripe portion of the card; and an alien card reader detector that detects alien card readers, the alien card reader detector located in a detector cavity in the first protrusion at the stripe path and within a card reader guide cover.

2. A card reader guide according to claim 1 comprising a cover coupled to a shielding plate, the shielding plate being located behind the card reader aperture so that the alien card reader detector does not detect any components within the self-service terminal (SST).

3. A card reader guide according to claim 2, wherein the shielding plate comprises a plastic material having a conductive coating to prevent metal components within the SST being detected as alien card readers.

4. A card reader guide according to claim 3, wherein the shielding plate includes an aperture through which data cards can be transported between the card reader guide and a card reader within the SST.

5. A card reader guide according to claim 4, wherein the shielding plate defines a plurality of apertures for routing cables therethrough.

6. A card reader guide according to claim 1, wherein a signal generator circuit is located in a signal generator cavity in the second protrusion.

7. A card reader guide according to claim 1, wherein the first protrusion is located beneath the second protrusion.

8. A card reader guide according to claim 1, wherein the first protrusion is located above the second protrusion.

9. A card reader guide according to claim 1, wherein the first and second protrusion extend from the card reader aperture by the same amount as a front edge of the data card extends from the card reader aperture upon being ejected by a card reader, so that the customer must place his or her fingers on the part of the data card that is not enclosed by the first and second protrusions.

10. A card reader guide according to claim 1, wherein the alien card reader detector comprises a capacitive sensor.

11. A self-service terminal (SST) incorporating a card reader guide according to claim 1.

12. A self-service terminal according to claim 11, wherein the terminal includes a motorized card reader.

13. A self-service terminal according to claim 12, wherein the terminal comprises an automated teller machine (ATM).

14. A card reader guide according to claim 1 further comprising:

a molded plastic cover dimensioned to be accommodated within the fascia, and partially protrude through an aperture in the fascia.

15. A card reader guide according to claim 1 wherein the alien card reader detector is physically configured to conform to the detector cavity in the first protrusion.

16. A card reader guide for use in a fascia of a self-service terminal, the card reader guide comprising:

a card reader aperture extending in a first direction through which a customer may insert a data card to a magnetic card reader;

a first protrusion extending (i) along part of the card reader aperture through which a magnetic stripe of the card passes, and (ii) towards the customer, wherein the first protrusion defines a stripe path aligned with the magnetic stripe of the card as the card is inserted by the customer;

a second protrusion, opposite to, and aligned with, the first protrusion, and extending (i) along the part of the card reader aperture through which the magnetic stripe of the card passes, and (ii) towards the customer;

an alien card reader detector that detects alien card readers, the alien card reader detector located in the first protrusion at the stripe path;

wherein the alien card reader detector comprises a capacitive sensor; and wherein the capacitive sensor comprises: (i) a transmit plate spatially separated from (ii) a receive plate by (iii) a ground strip defining a longitudinal shape and extending transversely to the card reader aperture and towards the customer.

17. A card reader guide according to claim 16, wherein the ground strip is aligned with the stripe path.

18. A card reader guide for use in a fascia of a self-service terminal, the card reader guide comprising:

a card reader aperture extending in a first direction through which a customer may insert a card with a data storing magnetic stripe to a magnetic card reader;

a first protrusion extending (i) along part of the card reader aperture through which the magnetic stripe of the card passes, and (ii) towards the customer, wherein the first protrusion defines a stripe path aligned with the magnetic stripe of the card as the card is inserted by the customer;

a second protrusion, opposite to, and aligned with, the first protrusion, and extending (i) along the part of the card reader aperture through which the magnetic stripe of the card passes, and (ii) towards the customer, a further portion beside the first and second protrusions providing a customer with the ability to remove the card by grasping a non-magnetic stripe portion of the card; and an alien card reader detector that detects alien card readers, the alien card reader detector located in a detector cavity in the first protrusion at the stripe path and within a card reader guide cover, wherein the alien card reader detector comprises a capacitive sensor having a ground strip aligned with the stripe path.

* * * * *